April 9, 1968     P. RABE ET AL     3,377,127
LIGHTER CASING STRUCTURE
Filed Aug. 18, 1965     2 Sheets-Sheet 1
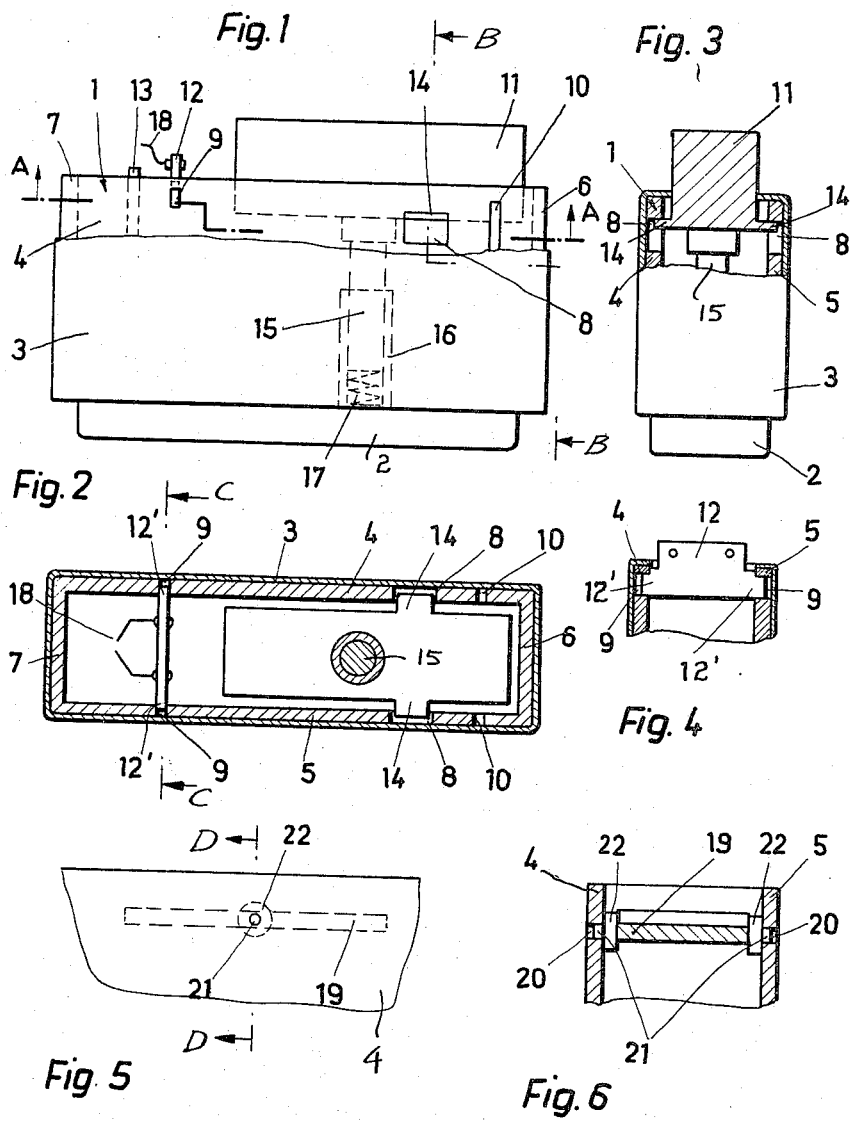
INVENTORS:
PETER RABE
ROLF EIMECKE
ERICH GISCHEL
HORST DIETERLE
BY Michael J. Striker
their ATTORNEY April 9, 1968   P. RABE ET AL   3,377,127
LIGHTER CASING STRUCTURE
Filed Aug. 18, 1965   2 Sheets-Sheet 2
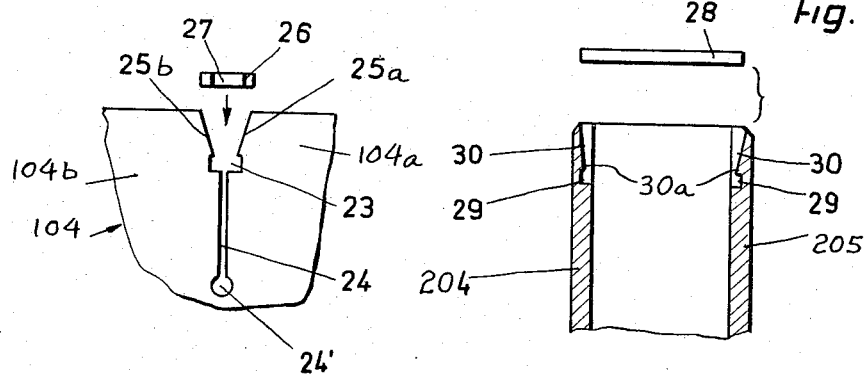
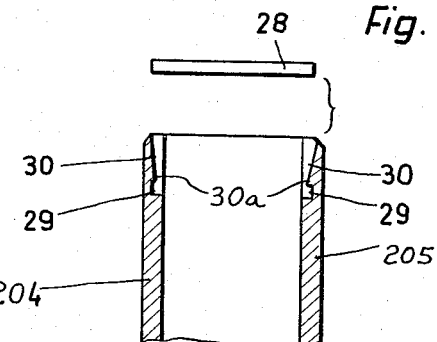
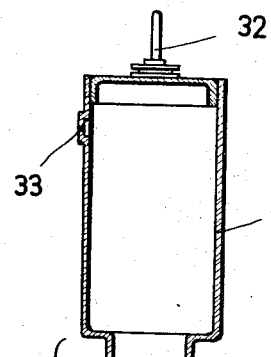
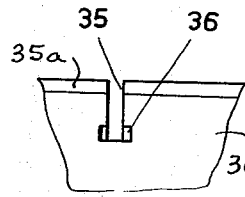
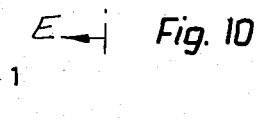
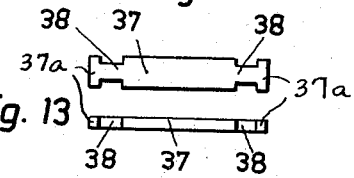
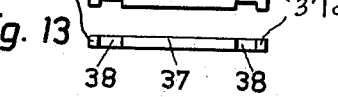
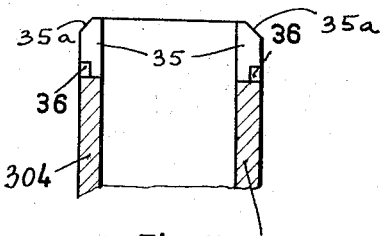
INVENTORS:
PETER RABE
ROLF EIMECKE
ERICH GISCHEL
HORST DIETERLE
BY
Michael J. Striker
their ATTORNEY

United States Patent Office 3,377,127
Patented Apr. 9, 1968

3,377,127
LIGHTER CASING STRUCTURE
Peter Rabe, Mulheim (Main), Rolf Eimecke, Offenbach, Burgel, Erich Gischel, Heusenstamm, and Horst Dieterle, Frankfurt am Main, Germany, assignors to Heinrich Maltner G.m.b.H., Offenbach am Main, Germany
Filed Aug. 18, 1965, Ser. No. 480,698
Claims priority, application Germany, Aug. 29, 1964, M 62,258
10 Claims. (Cl. 431—256)

ABSTRACT OF THE DISCLOSURE

The side walls of the housing in a lighter have several pairs of registering recesses receiving projections provided on inserts which are separable from the housing in response to elastic deformation of inserts and/or side walls. The projections can be fitted into the corresponding recesses with or without clearance, either to fix the inserts to the housing against relative movement or to permit for controlled reciprocating or other movement of inserts.

---

The present invention relates to improvements in the characteristics, construction and configuration of certain parts which constitute the components of a lighter. The invention also relates to a novel method of assembling such parts into a table lighter or pocket lighter.

Lighters normally comprise a large number of relatively small parts which must be rigidly or movably connected, coupled or otherwise assembled with each other by means of screws, rivets, bolts, by soldering, by gluing or by resorting to similar time-consuming methods. Overheating of very small parts during soldering may result in excessive deformation. Also, the production of small screws, and the formation of miniature tapped bores or holes involves much skill, time and complicated machines.

Accordingly, it is an important object of the present invention to provide a novel and improved method of assembling relatively small component parts of a lighter in such a way that the assembling operation may be carried out without heating and without resorting to special connectors or fasteners in the form of bolts, rivets, screws or the like and according to which certain component parts of a lighter may be assembled without necessitating the use of tools.

A further object of the invention is to provide a lighter wherein certain component parts are assembled in such a way that each thereof may be rapidly, conveniently attached or detached and wherein such assembly or dismantling may be carried out by persons having little technical skill, to provide novel connections between the housing and certain other component parts of a lighter, to provide a very simple and readily terminable connection between a shaft, pin, lever, actuating member, electrode holder, fuel tank or a similar insert and the side walls or other retaining members of a lighter housing, and to provide a lighter wherein all of the above enumerated parts may be connected to the housing without welding, soldering, gluing, bolting, riveting and/or screwing.

Another object of the invention is to provide a novel and readily terminable connection between two retaining members which preferably form part of the lighter housing and one or more inserts, and to construct and assemble the connection in such a way that the insert or inserts may rotate, that the insert or inserts may reciprocate or that such inserts may be detachably held against any movement with reference to the housing.

Still another object of the invention is to provide a connection of the just outlined characteristics wherein a single pair of retaining members in the form of walls or the like may support two or more inserts and wherein each such insert may be removed from its operative position with a minimum of effort, without resorting to any tools, and without bringing about any lasting deformation or other damage to itself or to the retaining members.

A further object of the invention is to provide a lighter wherein the inherent elasticity of its parts suffices to insure proper retention of one or more inserts in the housing.

Briefly stated, one feature of our invention resides in the provision of a lighter which comprises a first retaining member, an insert member, one of the two members having a female portion defining a recess and the other member having a male portion or projection extending into the recess, and a second retaining member engaging the insert member for normally holding the projection in the recess. At least one of the three members consists at least in part of elastic material and is deformable into a position in which the projection may be withdrawn from the recess to thus separate the insert member from the retaining members.

For example, the retaining members may constitute two spaced wall members of the lighter housing and may be provided with aligned recesses. The insert member may comprise two aligned projections each of which is receivable in or is withdrawable from one of the two aligned recesses in response to flexing of one retaining member with reference to the other retaining member, in response to flexing of both retaining members with reference to each other, or in response to elastic deformation of the insert member. The recesses may resemble through holes, shallow depressions or enlarged portions or zones of slots machined in one or more of the three cooperating members. Also, the two retaining members may form part of a single wall and may be separated from each other by a suitably configurated slot. The insert member may be an electrode holder, a depressible actuating member, a fuel tank, a shaft, a lever or another component which must be turnably, reciprocably or rigidly held in the housing of a lighter and which should be readily insertable into or withdrawable from the housing.

The improved method of assembling an insert member with two retaining members of a lighter wherein the insert member and at least one of the retaining members are provided with male and female portions, wherein at least one of the three members consists at least in part of elastically deformable material, and wherein the male portion is automatically held in the female portion in undeformed condition of the deformable member comprises the steps of elastically deforming the deformable member in a direction or sense to provide room for insertion of the male portion into the female portion, and thereupon releasing the deformable member so that such member may reassume its undeformed position and thus retains the male portion in the female portion.

In the drawings:

FIG. 1 is a side elevational view of a gas lighter whose component parts are constructed and assembled in accordance with a first embodiment of our invention, a portion of the shell which surrounds the upstanding side and end walls of the lighter housing being broken away;

FIG. 2 is a horizontal section substantially as seen in the direction of arrows from the line A—A of FIG. 1;

FIG. 3 is a partly end elevational and partly sectional view of the lighter, substantially as seen in the direction of arrows from the line B—B of FIG. 1;

FIG. 4 is a fragmentary vertical section substantially as seen in the direction of arrows from the line C—C of FIG. 2;

FIG. 5 is a fragmentary side elevational view of a side wall forming part of a lighter housing, further showing the outline of an insert in the form of a rockable lever which is assembled with and is readily detachable from the lighter housing;

FIG. 6 is a fragmentary transverse vertical section substantially as seen in the direction of arrows from the line D—D of FIG. 5;

FIG. 7 illustrates a further connection between a pair of retaining members and a flat strip-shaped insert;

FIG. 8 is a fragmentary vertical section through the side walls of a different lighter housing, further showing an insert which may be received between the side walls in response to elastic deformation of at least one side wall and/or in response to elastic deformation of the insert;

FIG. 9 is a transverse vertical section through a fuel tank and through the housing of the lighter shown in FIG. 1, these parts being shown in positions they assume prior to insertion of the tank into the housing;

FIG. 10 is a fragmentary side elevational view of a lighter housing whose side walls are provided with recesses which extend inwardly from their outer faces;

FIG. 11 is a fragmentary transverse vertical section as seen in the direction of arrows from the line E—E of FIG. 10;

FIG. 12 is a top plan view of an insert which may be assembled with the side walls shown in FIGS. 10 and 11; and FIG. 13 is a side elevational view of the insert shown in FIG. 12.

Referring first to FIGS. 1 to 4, there is shown a gas lighter which includes a housing 1 comprising a base 2 a pair of upstanding parallel side walls 4, 5, a pair of upstanding parallel end walls 6, 7, and a mantle or shell 3 whose underside is open and which is slipped onto the walls 4–7 in a manner as shown in FIGS. 2 and 3. The side walls 4 and 5 comprise transversely aligned female portions which define recesses 8, 9 and 10. Each of these recesses resembles a cutout and extends through the entire side wall 4 or 5. The recesses 8 are relatively wide, whereas the recesses 9 and 10 constitute relatively narrow vertical slots. The recesses 10 are particularly long and serve to enhance the elasticity of the side walls 4, 5 which consist of spring steel or another suitable elastic or springy metallic or plastic material so that they may be readily flexed toward or away from each other. When released, the side walls 4 and 5 assume the undeformed or unstressed positions shown in FIGS. 2 and 3. These side walls constitute two retaining members for a series of inserts including an actuating member 11 which extends upwardly through an opening provided in the shell 3 and is depressed by a finger when the lighter is put to actual use. Another insert is shown in the form of an electrode holder 12 which is adjacent to a burner tube 13 and comprises two electrodes 18 (see particularly FIG. 2) which define between themselves a spark gap.

The actuating member 11 is provided with transversely aligned male portions or projections 14 which are vertically reciprocably received in the corresponding female portions of the side walls 4 and 5, i.e., in the aforementioned recesses 8. The actuating member 11 further comprises a downwardly extending plunger 15 which is slidably telescoped into a cylinder 16 carried by the base 2 and which is biased by a prestressed helical return spring 17 tending to maintain the actuating member 11 in a position in which the projections 14 are received in the uppermost portions of the respective recesses 8. Thus, the surfaces bounding the upper ends of the recesses 8 constitute a pair of stops and serve to limit the upward movement of the actuating member 11.

The electrode holder 12 resembles an elongated bar or strip, and its longitudinal ends are provided with polygonal male portions or projections 12' which are non-rotatably received in the fit snugly (see FIG. 4) into the transversely aligned recesses 9 of the side walls 4 and 5. The position of the recesses 9 is selected in such a way that the spark gap between the electrodes 18 is sufficiently close to the burner tube 13, i.e., that the jet of compressed fuel issuing from the tube 13 is ignited in a fully automatic way as soon as the circuit of the electrodes is completed in response to manual depression of the actuating member 11 against the bias of the return spring 17. At the same time, the actuating member 11 opens a normally closed valve (not shown) which controls the outflow of fuel from a tank accommodated in the space below the burner tube 13. Such operation of the lighter is well known in the art and forms no part of the present invention.

An important feature of our invention resides in that the inserts 11 and 12 may be readily and rapidly inserted into or withdrawn from the space between the side walls 4 and 5. These side walls constitute two retaining members and at least one thereof is sufficiently elastic to allow for movement of the respective recesses 8, 9 away from the other recesses 8, 9. Thus, when the lighter is being assembled, and when the shell 3 is still detached from the walls 4–7, the person in charge simply grasps the median portions of the side walls 4 and 5 and flexes them away from each other until the width of the space between the recesses 8 suffices for insertion of the projections 14 and until the width of the space between the recesses 9 suffices to allow for insertion of the projections 12'. Once the projections 14 are moved into registry with the recesses 8 and the projections 12' register with the recesses 9, the operator releases the side walls 4, 5 so that they return to their undeformed positions and prevent uncontrolled separation of the members 11 and 12. As stated before, the relatively long vertical recesses or slots 10 enhance the flexibility or deformability of the side walls 4 and 5. It is clear that each of these side walls may be provided with two or more recesses 10 and that these side walls may constitute a pair of retaining members for only one, three or more insert members. Furthermore, it is equally clear that, in some instances at least, a single projection and a single recess will suffice to hold an insert member in requisite position with reference to the corresponding pair of retaining members. For example, one of the projections 12' on the electrode holder 12 and the recess 9 in the side wall 4 may be omitted so that the other projection 12' is held in the recess 9 of the side wall 5 when the inner face of the side wall 4 bears against the adjoining end portion of the electrode holder 12. In other words, it often suffices if the insert is provided with a single male portion or projection and if only one of the two retaining members is provided with a female portion which defines a recess for the male portion. Also, the position of the recesses 8, 9 and projections 14, 12' may be reversed; this would merely amount to a reversal in the position of such parts. For example, the side faces of the actuating member 11 may be provided with recesses corresponding to the recesses 8 and the side walls 4, 5 may be provided with inwardly extending projections corresponding to the projections 14.

The elasticity of the side walls 4 and 5 may be enhanced still further if the end walls 6 and 7 are omitted. The side walls 4, 5 and the base 2 then form a substantially U-shaped body whose legs are flexible toward and away from each other and constitute the retaining members for the actuating member 11 and electrode holder 12. In such housing constructions, the slots 10 may be dispensed with.

FIGS. 5 and 6 illustrate that the side walls 4 and 5 of the lighter housing may be provided with transversely aligned recesses 20 which resemble circular through bores and receive cylindrical pin-shaped projections 21 forming part of a rockable two-armed motion transmitting lever 19 which thus constitutes a further insert and serves to open the aforementioned control valve in automatic response to depression of the actuating member 11. Two bosses 22 of the lever 19 bear against the inner faces of the side walls 4 and 5 when the projections 21 are properly received in the respective recesses 20. It is obvious that the recesses 20 may resemble blind bores, i.e., that they need not extend all the way to the outer faces of the side walls 4 and 5. However, such recesses cannot detract from the appearance of the fully assembled lighter because they are invariably concealed when the shell 3 is slipped over the walls 4–7. The recesses 20 are not shown in FIGS. 1 to 4. They may be replaced by bores provided in the end faces of the bosses 22 if the projections 21 are integral with and extend inwardly from the inner faces of the side walls 4 and 5. In other words, here again, the position of the recesses 20 and projections 21 may be reversed without departing from the spirit of our invention.

In the embodiments which are illustrated in FIGS. 1 to 6, the inserts 11, 12 and 19 may be assembled with or detached from the side walls 4 and 5 in response to such flexing of the side walls that at least one thereof moves its female portion or portions from a predetermined plane. However, by suitably changing the configuration of the recesses, the inserts may be moved to or from their operative positions in response to elastic deformation of one or both retaining members in a predetermined plane, i.e, without necessitating a flexing of such retaining members from their respective planes. This is illustrated in FIG. 7 which shows that a flat strip-shaped insert 26 having a rectangular male portion or projection 27 may be coupled to a pair of retaining members 14a, 14b which form part of a single plannar side wall 104. The rectangular recess 23 can receive the projection 27 and this recess communicates with an upwardly diverging passage which is bounded by two mutually inclined cam faces 25a, 25b respectively provided on the retaining members 104a, 104b of the side wall 104. The minimum distance between the cam faces 25a, 25b in undeformed condition of the wall 104 is less than the width of the projection 27 so that, when he forces the projection 27 into the recess 23, the operator must flex the retaining members 104a, 104b in their own planes (i.e., in the plane of the side wall 104) until the projection snaps into and is then automatically retained in the recess. In order to facilitate such flexing of the retaining members 104a, 104b in the plane of the side wall 104, the latter is provided with an elongated and rather narrow slit 24 which communicates with the recess 23 opposite the passage between the cam faces 25a, 25b and whose lower end terminates in a circular portion or bore 24'. It will be seen that the passage between the cam faces 25a, 25b comprises a portion whose width is normally less than the width of the recess 23 and projection or end portion 27.

The bore 24' prevents further splitting of the side wall 104 and is of considerable importance when the material of the side wall is relatively brittle. The insert 26 may replace the electrode holder 12 of FIG. 1, and its other end portion may be received in a recess 23 (not shown) provided in a second side wall similar to the wall 104.

FIG. 8 illustrates a portion of a lighter housing which comprises two spaced retaining members in the form of side walls 204, 205 whose inner faces are provided with transversely aligned recesses 29. Each recess communicates with an upwardly extending and outwardly inclined passage or groove 30 whose minimum depth is less than the depth of the respective recess 29 so that, in order to receive and properly retain the end portions or projections of an insert 28, the side walls 204, 205 must be flexed away from each other until the end portions of the insert 28 may be slipped along and past the lobes or noses 30a at the lower ends of the grooves 30. The grooves 30 terminate in the upper end faces of the side walls 204, 205 and the maximum depth of these grooves (in undeformed condition of the side walls 204, 205) is preferably such that the end portions of the insert 28 may be inserted into such grooves without necessitating preliminary flexing of the side walls. In other words, the side walls 204, 205 will be flexed automatically following insertion of the end portions of the insert 28 into the upper ends of the grooves 30 and in response to exertion upon the insert of a pressure which tends to move its end portions along and past the lobes 30a. The insert 28 may constitute an electrode holder.

It will be seen that the embodibent of FIG. 8 differentiates from the embodiments of FIGS. 1 to 6 in two important respects, namely, that the side walls need not be flexed by hand but are flexed in automatic response to introduction of the insert, and that the recesses 29 need not extend all the way through the side walls 204, 205.

If the side walls 204, 205 consist of rigid material, the insert 28 must be flexible enough to permit for passage of its end portions along and past the lobes 30a. It is also possible to use an elastic insert 28 and to introduce the end portions of this insert into recesses defined by two elastically deformable side walls. Thus, not only the retaining members but also the insert may consist of elastically deformable material, even though it often suffices if only one thereof is elastically deformable.

FIG. 9 illustrates a tank 31 for liquefied butane gas or another compressed fuel. This tank comprises a top wall provided with a burner tube 32 corresponding to the tube 13 shown in FIG. 1, an one of its side panels is provided with a male portion or projection 33. The side walls 4, 5 of the housing 1 shown in the lower part of FIG. 9 may be flexed away from each other, and the side wall 4 comprises a female portion defining a single recess 34 which can receive the projection 33 of the fuel tank 31. The projection 33 and the recess 34 may but need not be of circular shape, as long as the projection can enter the recess when the tank is moved downwardly as indicated by an arrow. The tank 31 is automatically held in requisite position when the projection 33 enters the recess 34 because its outer sides abut against the inner faces of the adjoining portions of the housing 1.

The main difference between the embodiment of FIG. 9 and the embodiments of FIGS. 1 to 8 is that a single projection 33 suffices to properly locate the tank 31 with reference to the housing 1, i.e., with reference to the side walls 4 and 5 which constitute two retaining members for the tank, the latter constituting an insert and being releasably retained as long as the side walls are permitted to assume their undeformed or unstressed positions.

Referring finally to FIGS. 10 to 13, there is shown in FIGS. 10 and 11 a housing comprising two retaining members in the form of side walls 304, 305 whose outer sides or faces are provided with transversely aligned recesses or cutouts 36, see FIGS. 10 and 11. Each of these recesses communicates with a narrow slot 35 which extends upwardly and terminates in the end face of the respective side wall. The slots 35 are through slots but the recesses 36 constitute relatively shallow depressions in the outer faces of the side walls 304, 305. The width of these recesses is greater than that of the corresponding slots 35.

The insert 37 is shown in FIGS. 12 and 13. The overall length of this insert is somewhat less than the distance between the outer faces of the side walls 304, 305 when the side walls are allowed to assume their undeformed positions. The projections 37a at the longitudinal ends of the member 37 must be received in the recesses 36, and these projections are separated from the central portion of the insert member 37 by a pair of neck portions 38 which can pass through the slots 35. The upper end of each slot 35 is bounded by a downwardly and outwardly inclined cam face 35a which is engaged by one of the projections 37a when the insert 37 is moved downwardly, as viewed in FIG. 11. The projections 37 thereby cause the side walls 304, 305 to move toward each other and these side walls return to the positions shown in FIG. 11 only when the projections 37a actually enter the respective recesses 36. The insert 37 is then properly anchored in the housing and can be withdrawn only if the side walls 304, 305 are again moved toward each other to such an extent that the recesses 36 move inwardly of the respective end portions 37a.

The main difference between the embodiment of FIGS. 10–13 and the embodiments of FIGS. 1–9 is that the side walls 304, 305 must be flexed toward each other.

An advantage which is common to all embodiments of our invention is that the insert or inserts may be readily and rapidly inserted or removed without necessitating the use of any tools or by resorting to rudimentary tools; that the elasticity of the insert and/or of the retaining members suffices to insure proper retention or to facilitate rapid removal of the insert; and that the elasticity of one or more cooperating parts allows for repeated insertion or withdrawal of each insert. This is important when the lighter must be taken apart for the purposes of inspection, repair or cleaning and/or when an expendable part must be replaced with a fresh part. All that is needed for proper assembling of inserts and retaining members is to force or to otherwise move the projection or projections of each insert into the corresponding recess or recesses and to permit the elastically deformable part or parts to reassume their undeformed positions. If the elasticity of an insert is not sufficient to allow for rapid assembly or dismantling, the parts of the housing can always consist of at least partly elastic material so that they, too, can be deformed to insure rapid assembly or dismantling.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a lighter, a housing comprising a planar wall consisting of elastically deformable material and including two retaining members defining between themselves a recess, an open-ended passage communicating with said recess and having a portion whose width is less than the width of said recess in undeformed condition of said wall and a slot communicating with said recess and located opposite said passage, said slot enhancing the deformability of said wall and enabling one of said retaining members to move with reference to the other retaining member in the plane of said wall to thereby reduce or increase the width of said passage; and an insert having an end portion received in said recess, the extent to which said one retaining member is movable in the plane of said wall being such that said portion may be withdrawn from and inserted into said recess via said passage and the width of said end portion exceeding the width of said portion of said pasage in undeformed condition of said wall.

2. In a lighter, a combination comprising a housing having two retaining members; and a plurality of insert members each forming with said retaining members a group of three, one member of each group having a female portion defining a recess and another member of each group having a male portion received in the respective female portion, one of said portions being provided on the insert member and the other of said portions being provided on one retaining member of the respective group, the other retaining member of each group engaging the respective insert member for normally holding said male portion in the female portion and at least one member of each group consisting of elastic material and being elastically deformable into a position in which the male portion may be withdrawn from the respective female portion, at least one of said male portions being received with clearance in the respective female portion so that the corresponding insert member has limited freedom of movement with reference to at least one of said retaining members.

3. A combination as defined in claim 2, wherein said retaining members consist of elastic material.

4. A combination as defined in claim 2, wherein said retaining members constitute two spaced substantially parallel side walls of the housing and wherein said female portions are provided on at least one of said side walls.

5. A combination as defined in claim 4, wherein said housing further comprises a pair of end walls integral with said side walls and defining therewith a chamber for said insert members.

6. A combination as defined in claim 2, wherein each of said retaining members is provided with a female portion for each of said insert members and wherein each insert member comprises two male portions each received in a female portion of one of said retaining members.

7. A combination as defined in claim 2, wherein at least one of said insert members consists of elastically deformable material.

8. A combination as defined in claim 2, wherein at least one of said male portions is of other than circular outline and is snugly fitted into the respective female portion to normally fix the corresponding insert member against movement with reference to said housing.

9. In a lighter, a combination comprising a housing having two retaining members constituting two spaced substantially parallel side walls of the housing and each having an inner face spaced from and located opposite the inner face of the other retaining member; and a plurality of insert members each forming with said retaining members a group of three, one member of each group having a female portion defining a recess and another member of each group having a male portion received in the respective female portion, one of said portions being provided on the insert member and the other of said portions being provided on one retaining member of the respective group, the other retaining member of each group engaging the respective insert member for normally holding said male portion in the female portion and at least one member of each group consisting of elastic material and being elastically deformable into a position in which the male portion may be withdrawn from the respective female portion, said female portions being provided on at least one of said retaining members and at least one of said female portions constituting a recess in the inner face of said one retaining member.

10. In a lighter, a combination comprising a housing having two retaining members; and a plurality of insert members each forming with said retaining members a group of three, one member of each group having a female portion defining a recess and another member of each group having a male portion received in the respective female portion, one of said portions being provided on the insert member and the other of said portions being provided on one retaining member of the respective group, the other retaining member of each group engaging the respective insert member for normally holding said male portion in the female portion and at least one member of each group consisting of elastic material and being elastically deformable into a position in which the male portion may be withdrawn from the respective female portion, the elastic member of at least one of said groups being provided with at least one slot which enhances the elasticity thereof.

References Cited

UNITED STATES PATENTS

| | | | |
|---|---|---|---|
| 1,116,281 | 11/1914 | Hoofer | 67—7.1 |
| 2,507,202 | 5/1950 | Finch | 67—7.1 |
| 2,807,947 | 10/1957 | Renwick | 67—7.1 |
| 2,949,758 | 8/1960 | Gellman | 67—7.1 |
| 3,092,988 | 6/1963 | Meyers | 67—7.1 |

EDWARD J. MICHAEL, *Primary Examiner.*